Inventor:
William B. Osborne
By Edward C. Fitzhaugh
Atty

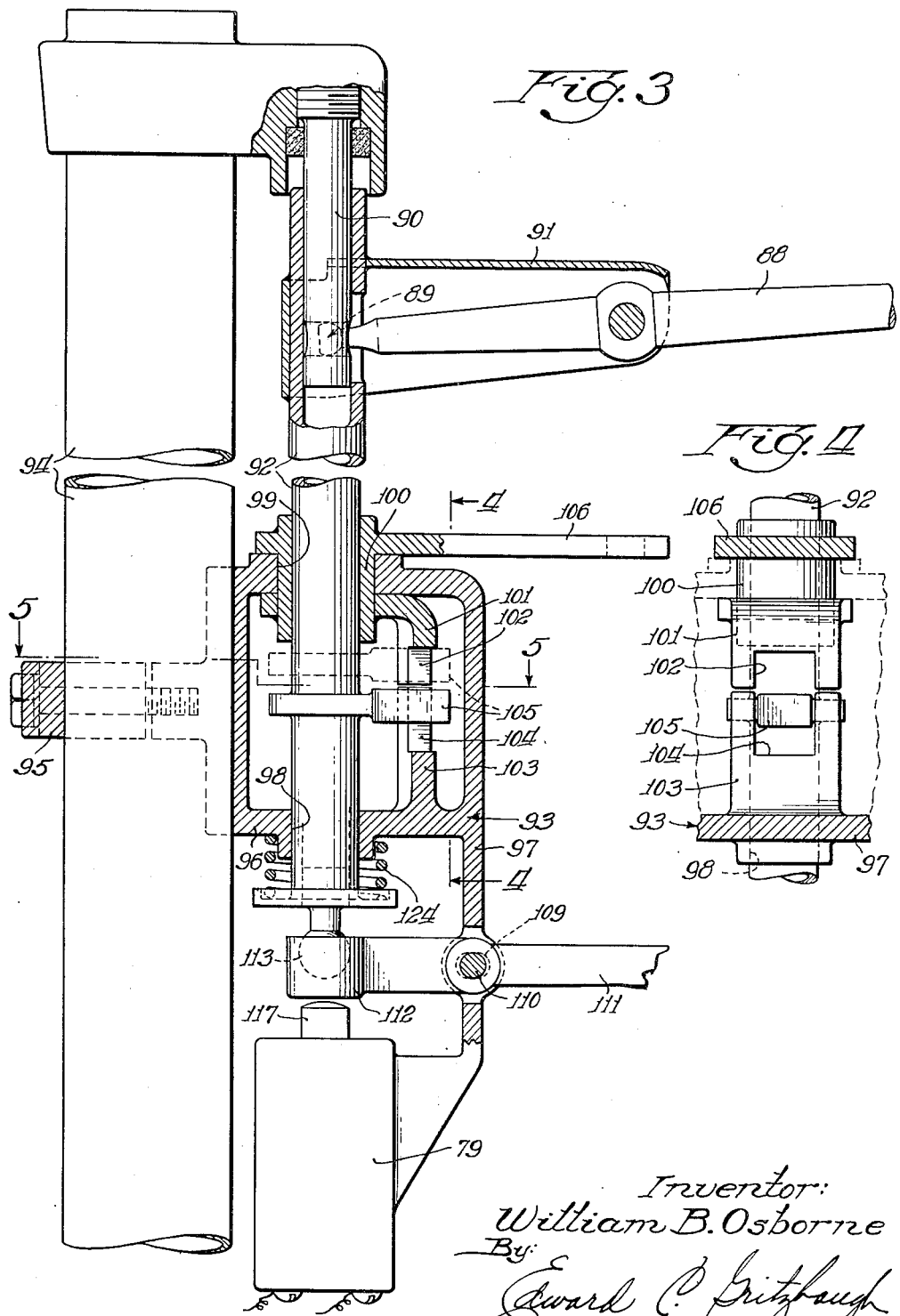

Patented Apr. 24, 1945

2,374,303

UNITED STATES PATENT OFFICE 2,374,303

TRANSMISSION CONTROL

William B. Osborne, Muncie, Ind., assignor to Borg-Warner Corporation, Chicago, Ill., a corporation of Illinois Application January 9, 1942, Serial No. 426,123

26 Claims. (Cl. 74—189.5)

This invention relates to transmissions and particularly to a control mechanism therefor.

It has been proposed to provide a transmission for automotive vehicles, which is automatic in operation and which does not require the use of a clutch pedal or the equivalent in order to condition it for forward or reverse drive. One such transmission is disclosed in a copending application of J. M. Simpson et al., Serial No. 426,122, filed January 9, 1942, and comprises a hydrodynamic device, such as a torque converter, combined with gearing to produce variations in torque and speed as required by the operator. Automatic changes in ratio are provided through the gearing by means of a speed-responsive-controlled hydraulic device and the torque converter may be locked up mechanically above a predetermined speed by additional automatically operated means.

In transmissions of the above type, it is desirable to provide a master control for the speed responsive means so that said means is effective only in a forward direction. It has also been found desirable to provide a master valve in the hydraulic ratio-changing device to prevent the occurrence of an inadvertent shift in the transmission when the transmission is conditioned for neutral. Since no clutch pedal is provided, it is possible for an operator inadvertently to leave the transmission conditioned for forward or reverse drive when the engine is dead and then to attempt to start the engine. This latter condition is dangerous since the subsequent rotation of the engine immediately puts the vehicle in motion and accordingly, it has been found desirable to provide a control for the starting mechanism which renders the starting mechanism inoperative except when the transmission is conditioned for neutral. In addition to the foregoing controls, I have found that where a hydrodynamic device is used in lieu of a disconnectible clutch and the engine is provided with an automatic choke in order to secure a fast idling speed during the warming-up period for the engine, that such fast idle will cause the hydrodynamic device to develop sufficient torque to render it difficult, if not impossible, to effect smooth shifts from neutral to forward and reverse and to keep the car stationary when the transmission is set for forward or reverse drive.

The present invention seeks to provide a control mechanism for an automatic transmission of the hydrodynamic type wherein provision is made for obviating each of the difficulties above enumerated and wherein the control mechanism normally used for operating such a transmission is connected to the means for obviating the difficulties in such a manner that the operator is not required to take any special precautions in the operation of the transmission.

The principal object of this invention, therefore, is to provide a control mechanism for an automatic transmission, said control mechanism having a lever which is adapted to assume the normal and usual positions for such a control lever in conditioning the transmission for forward, neutral and reverse operation, and wherein means are provided, automatically actuated by movement of, or in timed relation with, the control lever to its various positions for (1) preventing operation of the automatic control for the transmission when the transmission is set for neutral or reverse, (2) preventing the hydraulic or other power-operated ratio changing means of the transmission from operating when the transmission is conditioned for neutral, (3) preventing the starter from becoming effective at all times except when the transmission is conditioned for neutral, and (4) reducing the speed of the engine from a fast idling speed to a normal idling speed when the transmission is conditioned for forward or reverse drive.

A specific object of this invention is to provide a unitary control for a transmission, and for the speed regulator for the engine to which the transmission is connected, wherein the speed regulator is automatically adjusted from a fast idling condition to a slow idling condition when the transmission is conditioned for forward or reverse drive.

Another specific object of this invention is to provide a unitary control mechanism for a transmission and for the starter for the gasoline engine or the like associated with the transmission wherein the starter is rendered inoperative at all times except when the transmission is conditioned for neutral.

Another specific object of this invention is to provide a control mechanism for an automatic transmission having speed responsive control means wherein the speed responsive control means is rendered inoperative when the transmission is conditioned for reverse drive.

Yet another specific object of this invention is to provide a control mechanism for an automatic transmission wherein hydraulic or other power means is used to effect shifts in the transmission under the control of a speed responsive device, with means, operable as a function of the operation of the means for conditioning the transmission for forward, neutral or reverse operation, whereby said hydraulic or other power means is rendered inoperative when the transmission is conditioned for neutral.

These and other objects and features of this invention will become apparent from the following detailed description of the invention when taken together with the drawings which accompany this description and in which Fig. 1 is a schematic diagram of a transmission to which this invention may be applied;

Fig. 3 is an enlarged side elevation in section taken through the principal mechanical portion of the control mechanism;

Fig. 4 is a section through the mechanism of Fig. 3 taken along lines 4—4 thereof;

Figure 1:
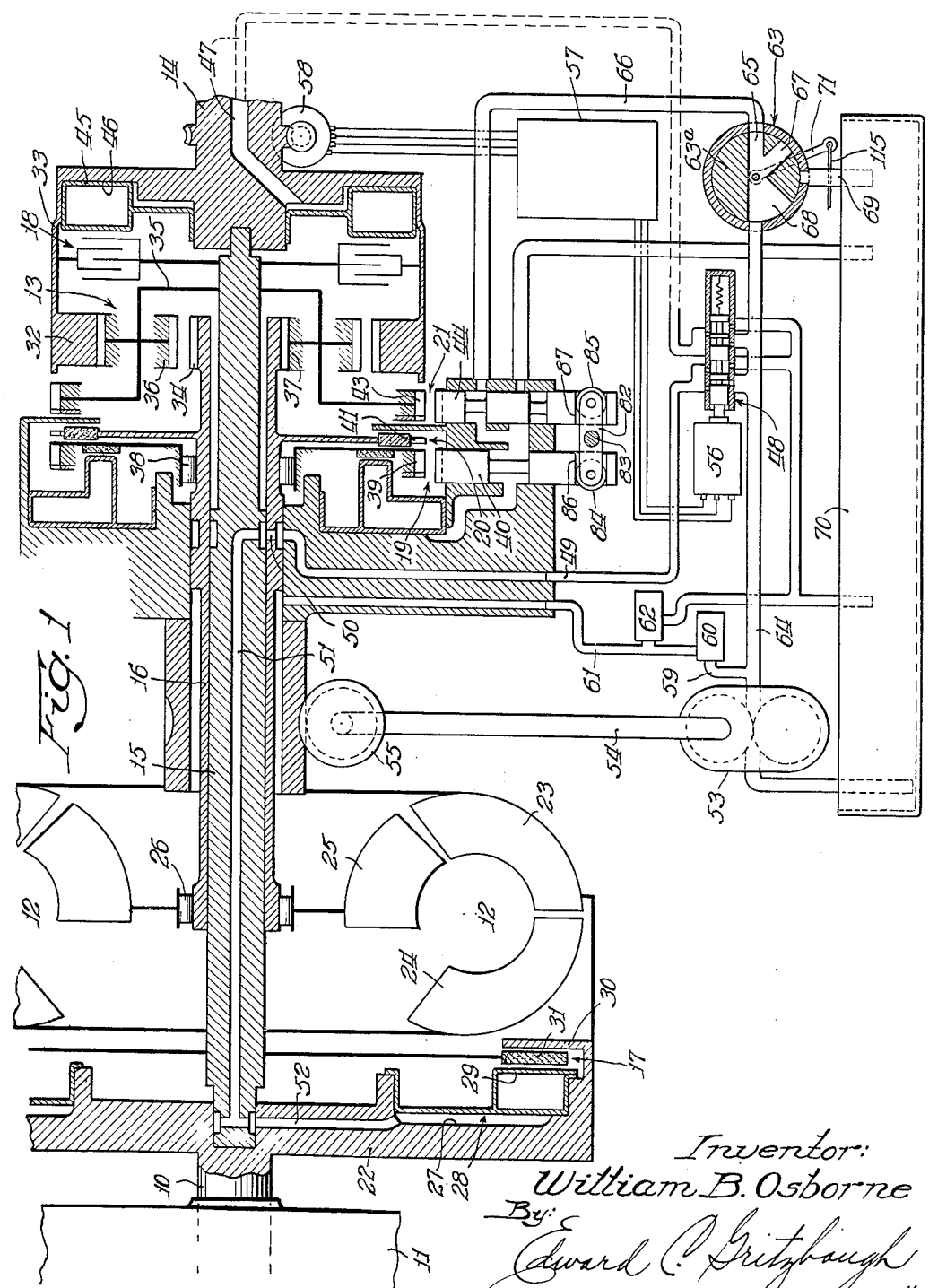

Referring now to the drawings for a detailed description of the invention, and particularly to Fig. 1, the transmission is comprised of a drive shaft 10, which may be connected to a prime mover such as internal combustion engine 11, a hydraulic torque converter 12, a planetary gear set 13 and a driven shaft 14. The torque converter 12 is connected to gearing 13 by means of a shaft 15 and also by means of a concentric hollow shaft 16. A lock-up clutch 17 is used to obtain a mechanical drive through the front end of the transmission around converter 12, a multi-plate friction clutch 18 is used to lock up planetary gear set 13 to change the torque ratio therethrough, and three brakes of the positive type 19, 20 and 21 serve as forward, push start and reverse controls respectively, for the transmission.

Attached to drive shaft 10 is a housing 22 to which is secured the pump element 23 of torque converter 12. Said torque converter is comprised additionally of a turbine element 24 connected to shaft 15 and a stator 25 connected to hollow shaft 16 through a roller-and-cam device 26 which during forward drive functions as a one-way brake, and during reverse drive functions as a clutch. Within housing 22 is an annular cylinder 27 in which is slidably, but not rotatably (relative to housing 22), received an annular piston 28 having a pressure transmitting member 29 secured thereto. Housing 22 is also provided with an inwardly extending flange 30 spaced from pressure transmitting member 29. Within the space between flange 30 and member 29 is a friction plate 31 which is secured to rotate with shaft 15. It will be observed that when piston 28 is moved to the right (Fig. 1) so as to clamp friction plate 31 against flange 30, drive shaft 10 will be directly and mechanically connected to shaft 15, thereby locking up torque converter 12.

Planetary gear set 13 is comprised of a ring gear 32 secured to a drum 33 which is rotatable with driven shaft 14, a sun gear 34 mounted for rotation with hollow shaft 16, a carrier 35 mounted on shaft 15 so as to be rotatable therewith, and a plurality of double planet pinions 36 and 37 mounted on carrier 35. Said planet pinions are so arranged that a pinion 36 meshes with ring gear 32 and also with planet pinion 37, and said planet pinion 37 meshes with sun gear 34.

Brake 19 is connected to hollow shaft 16 through a roller-and-cam device 38, and brake 20 is connected directly to hollow shaft 16. Brake 21 is connected to carrier 35. Brake 19 is comprised of a toothed ratchet wheel 39 and a radially slidable, rotationally fixed pawl 40. Brake 20 is comprised of a ratchet wheel 41 and a radially slidable, rotationally fixed pawl (not shown). Brake 21 is comprised of a ratchet wheel 43 and a radially slidable, rotationally fixed pawl 44.

Clutch 18 is controlled by means of a piston 45 received in an annular cylinder 46 formed in drum 33. Said piston 45 is operated by fluid pressure introduced into cylinder 46 through a conduit 47 in which is interposed a selector valve 48. Said valve 48 is also interposed in a conduit 49 which conducts fluid under pressure through interconnecting passage-ways 50 in hollow shaft 16, 51 in shaft 15 and 52 in fly-wheel housing 22 to annular cylinder 27 in fly-wheel housing 22. The hydraulic pressure is derived from a pump 53 which is driven through a shaft 54 from suitable gearing 55 connected directly to housing 22. The fluid is pumped from a sump 70 and conducted to valve 48 by a conduit 64.

Selector valve 48 is controlled by a two-stage solenoid 56 which in turn is controlled by a suitable electrical circuit 57 from a governor 58 driven from driven shaft 14.

Neutral is obtained by releasing all clutches and brakes. This means that clutch 18 is released so as to break the connection between shaft 15 and driven shaft 14; brakes 19, 20 and 21 are released so that no reaction is provided for sun gear 34, and clutch 17 is likewise released so that any power transmitted to housing 22 is passed on to shaft 15 through torque converter 12 only. Under these conditions no drive is possible from the engine to driven shaft 14.

To start the vehicle from a dead stop, brake 19 is applied and all other clutches and brakes are released. This provides a reaction for sun gear 34 through roller-and-cam device 38 which is designed to prevent reverse rotation of the sun gear. Roller-and-cam device 26 is arranged to prevent reverse rotation of stator 25 relative to hollow shaft 16 and hence, when brake 19 is applied, sun gear 34 and stator 25 are both held against reverse rotation. Torque impressed on drive shaft 10, therefore, is multiplied in hydraulic torque converter 12 and transmitted to shaft 15, from which it passes through carrier 35, ring gear 32 and drum 33 to driven shaft 14, planetary gear set 13 likewise multiplying the torque as it is received from shaft 15.

It will be noted that since pump 53 is driven directly from housing 22, full hydraulic pressure is available whenever shaft 10 is rotating. No hydraulic pressure is required by the transmission for starting the car except such as is necessary in housing 22 to maintain the housing filled with fluid for the operation of torque converter 12. The proper distribution of fluid under pressure to housing 22 for efficient operation of the transmission is effected by means of a conduit 59 connected to pump 53, a pressure-regulating valve 60 which provides fluid under relatively high pressure for the operation of the various clutches and brakes, and a conduit 61 leading to housing 22, the pressure in conduit 61 being maintained at a lower value by a second pressure-regulating valve 62.

When a predetermined speed of rotation of driven shaft 14 is reached, governor 58 will condition electrical circuit 57 and solenoid 56 to move valve 48 in a manner to admit fluid under pressure to both lock-up clutch 17 and clutch 18. Brake 19 is applied initially as aforesaid and remains so. Stator 25, however, will rotate forwardly with the pump and turbine elements 23 and 24 respectively, just as soon as the fluid within the torque converter begins to impinge upon the backs of the vanes of the stator. The presence of the roller-and-cam device 26 makes this possible. Similarly, when clutch 18 is engaged so as to cause ring gear 32, carrier 35 and sun gear 34 to rotate as a unit, such rotation will be made possible despite the continued engagement of brake 19, for the reason that roller-and-cam device 38 is designed to release sun gear 34 when the latter tends to rotate in a forward direction.

Reverse is obtained by releasing brake 19 and engaging brake 21. This arrests the rotation of carrier 35, shaft 15 and turbine element 24, and releases sun gear 34, as well as stator element 25, for backward rotation. Under these conditions, with pump element 23 rotating in a forward direction and the turbine element 24 stationary, stator element 25 will rotate in a reverse direction, thereby rotating sun gear 34 reversely with it. This reverse rotation is transmitted through planetary gears 36 and 37 to ring gear 32 and then through drum 33 to driven shaft 14.

Interposed in the outlet of pump 53 is a valve 63 which is connected thereto by means of conduit 64. Said valve 63 in the embodiment selected for illustration is of the rotary type and is provided with a passage-way 65 through which fluid under pressure may pass to a conduit 66 leading to another portion of the hydraulic circuit. Said valve 63 is also provided with a side outlet 67 and with a relatively wide sector-shaped passage-way 68 at the inlet side of the valve. A bleed conduit 69 connects the valve to sump 70. Valve 63 may be rotated from an external control by a crank 71 which is connected to the rotary valve body 63a and is adapted to rotate valve body 63a to any one of three positions. In the position shown, bleed conduit 69 is closed and a direct passage-way is provided between pump 53 and conduit 66. In a second position, valve body 63a may be rotated to cut off pressure to conduit 66 and to the bleed conduit 69, thereby maintaining pressure in the remainder of the system but preventing operation of the hydraulic system associated with conduit 66. In a third position, sector-shaped conduit 68 is connected to bleed conduit 69 through conduit 67, conduit 66 being blocked off by the valve body. The third position, therefore, connects pump 53 directly with sump 70 and prevents the building up of pressure in the system. Valve 63 thus functions as a master valve for the entire hydraulic system and prevents the operation of any of the fluid-operated devices under certain conditions.

Figure 6:
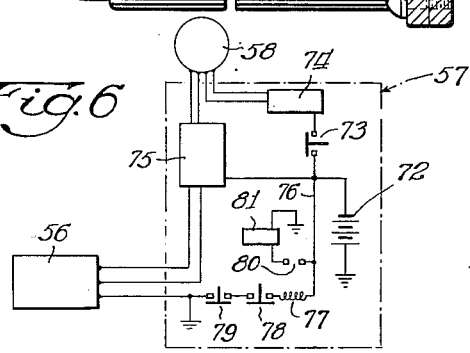
Fig. 6 is a wiring diagram showing how the electrical controls of Fig. 2 are connected to the starter and transmission.

Referring now to Fig. 6, the electrical system may be described briefly as comprising a battery 72, or other source of the electrical energy, which may be connected through a manually controlled switch 73 and other suitable controls 74 to an electrical governor 56. Said governor is connected through suitable additional controls 75 to solenoid 58. Battery 72 is also connected through a second branch 76 to a starter circuit which includes a starter relay 77, the usual starter button 78 and a master starter control switch 79 in series with button 78. Relay contacts 80 connect battery 72 to starter 81 when relay 77 is energized. It is obvious that since switches 78 and 79 are in series, starter relay 77 will not be energized unless both switches are simultaneously operated. Thus, switch 79 functions as a master switch for the starter circuit and switch 73 functions as a master switch for the governor circuit. The controls 74 and 75 are described in detail in the aforementioned Simpson application and hence, the description will not be repeated here.

Referring again to Fig. 1, pawls 40 and 44 are connected to a common lever 82 which is mounted on a rock shaft 83 and is provided with rollers 84 and 85 riding in slots 86 and 87 in pawls 40 and 44 respectively. Thus, by rocking shaft 83 one pawl is engaged while the other is disengaged, and by positioning lever 82 as shown in Fig. 1, both pawls may be disengaged simultaneously to provide a neutral.

Figure 2:
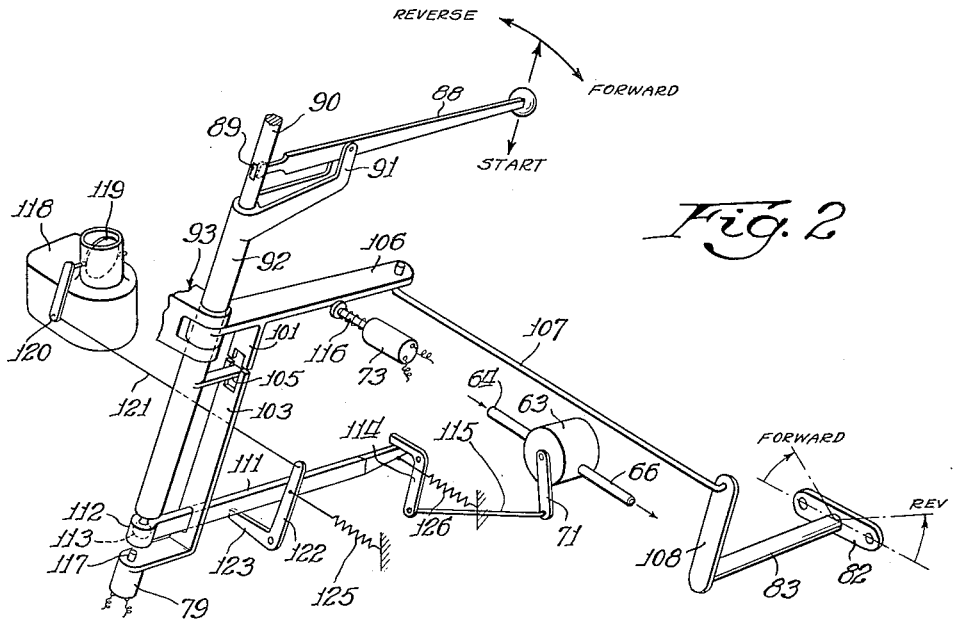
Fig. 2 is a schematic diagram in perspective showing the novel mechanical control system.

The external controls for the various master switches, the master valve and the pawls are shown in Fig. 2 and are operated by means of a single lever 88, preferably located at the steering wheel, which is adapted to be moved from a depressed central position corresponding to a neutral position, to a raised and then counterclockwise rotated position corresponding to reverse drive, and to a raised clockwise rotated position corresponding to forward drive. Thus, lever 88 is movable in two intersecting planes, one plane containing the forward, neutral and reverse positions, and the other plane intersecting the first at the neutral position and providing a range of movements for the lever while the transmission is conditioned for neutral.

Figure 5:
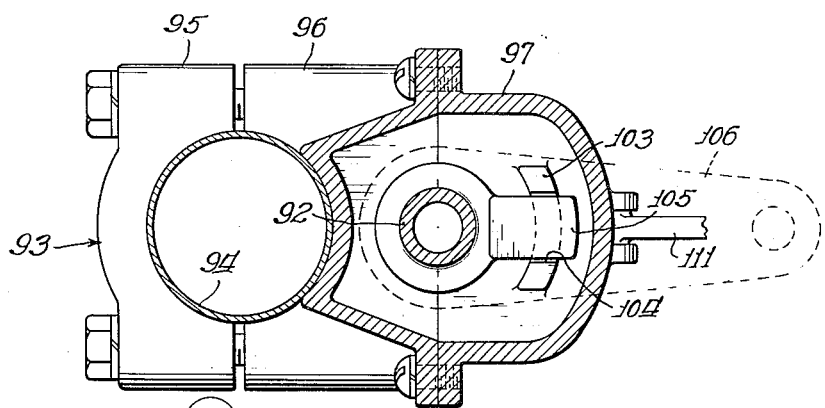
Fig. 5 is a section through the mechanism of Fig. 3 taken along lines 5—5 thereof.

Lever 88 is pivoted at 89 to an axially fixed rod 90 and is also pivotally connected to a bracket 91 which is connected to a hollow rod 92 telescoped over rod 90 so as to receive support therefrom. Said bracket 91 is axially movable relative to rod 90 in response to vertical movement of lever 88. Said rod 92 is held in alignment with rod 90 by means of a support 93 fixed to steering column 94 (Figs. 3 and 5), the support being such as to permit rotation of rod 92 therein. Said fixed support may comprise three castings 95, 96 and 97 bolted together as shown, castings 95 and 96 constituting a clamping means for securing the support to steering column 94. Two spaced openings 98 and 99 are provided in support 93 through which rod 92 passes. Between rod 92 and opening 99, however, is inserted a short hollow shaft 100 to one side of which is secured a lug 101 which is bent downwardly and in the open end of which is a slot 102. In opposed relation to lug 101 is a fixed lug 103 formed in the lower part of support 93 and having a similar slot 104 formed in the end thereof. Rod 92 is provided with a lug 105 which is secured thereto so as to be rotatable with the rod, lug 105 extending outwardly into one or the other of the slots 102 and 104. Thus, when rod 92 is lowered, it is limited to a vertical movement as long as it is received in slot 104, but when rod 92 is raised sufficiently to be free of slot 104 and to be fully received in slot 102, the rod may then be rotated about its own axis, thereby rotating with it lug 101 and short hollow shaft 100.

Attached to short hollow shaft 100 is a lever 106 which is connected by means of a rod 107 (Fig. 2) to another lever 108 which in turn is directly connected to rock shaft 83 of the forward, neutral and reverse control for pawls 40 and 44. Thus, raising lever 88 to its upper plane and then moving it to forward or reverse position as described above results in the engagement or release of the corresponding pawls 40 and 44 at the transmission.

Support 93 is also provided with a pair of spaced slots 109 in which is received a pin 110 forming the pivoted support for a lever 111 positioned in proximity to the lower end of rod 92. One end 112 of lever 111 is provided with a ball socket in which is received a ball 113 secured to the lower end of rod 92. Thus, lever 111 will be rocked about its pivot 110 by the vertical movement of rod 92 but it will not be disturbed when rod 92 is rotated about its own axis. Said lever 111 contacts a bell crank 114, the free arm of which is connected by means of a rod 115 to crank 71 of valve 63. It will be apparent that by raising and lowering lever 88 while it is in neutral, bell crank 114 is rotated, and because of the connection provided by rod 115 and crank 71, valve 63 is likewise rotated to assume any one of the three positions available.

Suitably supported in proximity to lever 106 is master control switch 73 which controls the effectiveness of electric governor 58. Said switch 73 is provided with a rod 116, the end of which is contacted by lever 106 as the lever is oscillated by lug 105 of rod 92. The contacts in switch 73 are so arranged that the circuit is broken therethrough at all times except when lever 88 is rotated to its forward position. By arranging the contacts in this manner, the circuit to the governor 58 is broken when lever 88 is either in the neutral or reverse position.

Also in proximity to lever 111 and particularly in proximity to end 112 thereof is located master switch 79 for starter 81. Said switch 79 is provided with a rod 117 which extends upwardly in the vicinity of end 112 of lever 111. When rod 92 is lowered, it contacts the end of rod 117 and causes the contact associated therewith (not shown) to complete the circuit therethrough. Normally, however, the circuit through switch 79 is broken and starter 81 cannot be operated by the usual starter button 78. Thus, when it is desired to start the engine, control lever 88 must first be placed in the neutral position and then allowed to drop downwardly in the intersecting plane to the lower limit of its movement before the circuit through switch 79 is completed, and when so dropped starter button 78 will then be effective to energize starter relay 77. This sequence of operation renders impossible the starting of the engine while the transmission is set for either forward or reverse drive.

Also associated with lever 111 is the control for the automatic fast idle in the carburetor. The carburetor as shown schematically at 118 is provided with a valve 119 which may be operated thermostatically (not shown) as is standard practice at the present time in order to provide a fast idling speed for the engine during the period that the engine is warming up. Said valve 119 is provided with a crank 120 which is connected by means of a rod or wire 121 to a bell crank 122. The free arm 123 of bell crank 122 is adapted to contact lever 111 so as to be movable therewith. The crank arms are so proportioned that when lever 88 is in its lowermost position wherein starter master switch 79 is operated to permit the engine to be started, valve 119 is in its fast idling position, and as lever 88 is raised to the point of intersection with the plane containing forward and reverse positions preparatory to moving to one or the other of these positions, valve 119 is gradually rotated to a position corresponding to a normal idling speed. By this means the speed of the engine is reduced sufficiently so that little or no torque is transmitted through the torque converter 12 and hence no difficulty will be experienced in engaging either pawl 40 or pawl 44 with its respective ratchet wheel to provide forward or reverse drive.

In the form shown, rod 92 is normally biased downwardly by means of a spring 124 so that lever 88 will tend to move downward to its starting position each time it passes through neutral. Springs 125 and 126 may be provided for bell cranks 122 and 114 respectively, to maintain said cranks in contact with lever 111 and thereby provide a positive action for valve 63 and valve 119.

Changes of a minor nature may be made in the invention as described above without departing from the scope of the invention, and it is to be understood, therefore, that the scope of this invention is not to be limited to the foregoing description but is to be limited by the appended claims.

I claim:

1. A control mechanism for a power transmitting device for an engine, said device comprising means for establishing a neutral condition therein and for conditioning the device for transmitting power either in forward or reverse; means for starting the engine, said control mechanism including a lever which is movable in at least two planes, said lever when moved in one of said planes selectively establishing a neutral condition in said device or conditioning the device for transmitting power either in forward or reverse, the other of said planes passing through the position of the lever corresponding to neutral condition for the device, and means for controlling the engine starting means, said last-mentioned means being operable by movement of the lever in the said last mentioned plane in a direction away from the line of intersection of the two planes for starting the engine.

2. A control mechanism for a power transmitting device for an engine, said device comprising means for establishing a neutral condition therein and for conditioning the device for transmitting power either in forward or reverse; means for starting the engine, means for preventing the last-mentioned means from operating, said control mechanism including a lever which is movable in at least two planes, said lever when moved in one of said planes selectively establishing a neutral condition in said device or conditioning the device for transmitting power either in forward or reverse, the other of said planes passing through the position of the lever corresponding to neutral condition for the device, said means for preventing the starting means from operating being rendered effective by movement of the lever in the said last mentioned plane in a direction toward the intersection of the planes.

3. In combination an engine, means providing a fast idling condition and a normal idling condition in the engine, a transmission driven from the engine and having means for establishing a plurality of power transmitting conditions therein and a neutral condition, a control for the transmission selectively to establish said last mentioned conditions, and means associated with and operable prior to the setting of the control for each of said last mentioned conditions other than neutral for providing the normal idling condition in the engine instead of the fast idling condition.

4. In combination an engine, means providing a fast idling condition and a normal idling condition in the engine, a transmission driven from the engine and having means for establishing a plurality of conditions therein including a neutral condition, a control for the transmission movable in either one of two intersecting planes, said control when movable in one plane being adapted to establish forward, neutral and reverse conditions in the transmission, said intersecting plane passing through the position of the control corresponding to neutral and means operable by movement of the control in the intersecting plane to its position therein corresponding to neutral for providing the normal idling condition in the engine instead of the fast idling condition.

5. In combination an engine, means for producing a fast idling condition in the engine, means for starting the engine, a control for the starting means, a variable speed transmission for transmitting and varying the power produced by the engine, a manually operable control for the transmission, said control being movable in two intersecting planes in one of which planes said control effects changes in the transmission and in the other of which no change is effected in the transmission, and means operable by the manual control when operated in the plane in which no change is effected in the transmission for operating the control for the starter to render the starter inoperative and for operating on the first-mentioned means to produce a normal idling speed in the engine.

6. A combination as described in claim 5, said manual control comprising a lever, a rod controlled by said lever and movable axially and rotatably, and means responsive to axial movement of the rod for operating the starter control and the means for producing a fast idle.

7. In combination an engine, means providing a fast idling condition in the engine, a transmission driven from the engine and having means for establishing a plurality of conditions therein including a neutral condition, a manually operated control for the transmission selectively to establish said condition, said control being movable in two intersecting planes, neutral condition corresponding to the position of the control wherein the planes intersect, a starter for the engine, a master control for the starter, means operable by the manual control and connected to the fast idling means, means connecting the manual control to the master control for the starter, said two last-mentioned means being operable only when the manual control is moved in one of the planes, speed responsive means for effecting changes in the transmission, a master control for the speed responsive means, and means connecting the manual control and the master control for the speed responsive means and operable only when the manual control is movable in the other of said planes.

8. In combination an engine, means providing a fast idling condition in the engine, a transmission driven from the engine, manually operable means for conditioning the transmission for forward, neutral and reverse operations, power means for effecting ratio changes in the transmission, speed responsive means for controlling the power means changes, a master control for the power means, a master control for the speed responsive means, a starter for the engine, a master control for the starter, a manually operable lever movable in one plane to positions corresponding to forward, neutral and reverse and movable in another plane intersecting the first plane at the neutral position therein, and means connecting the lever to all of said master controls, the fast idling condition producing means and to the means for conditioning the transmission for forward, neutral and reverse operation.

9. A combination as described in claim 8, the connecting means being adapted to operate the fast idling means, the master control for the starter, and the master control for the power means incidental to movement of the lever in the intersecting plane, and adapted to operate the master control for the speed responsive means and the means for conditioning the transmission for forward, neutral and reverse operations incidental to movement of the lever in the intersected plane.

10. In combination an engine, a transmission therefor, controls for the engine and transmission, a lever, and means connecting the lever to the controls, said means comprising a pivot for the lever for providing one degree of freedom to the lever, a rod movable with the lever in said one degree of freedom, a pivoted support for the rod providing a second degree of freedom for the rod and lever, a lug movable with the rod in both degrees of freedom, a lever engageable by the lug when the lug and rod are moved by the first-mentioned lever about the first-mentioned pivot and at one extremity of movement thereabout, and means engageable by the lug for preventing rotation of the lug, rod and lever about the second pivot at all times when the lug is not in contact with the second-mentioned lever.

11. A combination as described in claim 10, and means connecting the lever engageable by the lug with the control for the transmission.

12. In combination an engine, a transmission therefor, controls for the engine and transmission, a manually operated lever, and means connecting the lever to the controls, said means comprising a fixed pivot for the lever, a rod movable with the lever, a support for the rod permitting rotation of said rod and lever, a pivoted lever located in proximity to the rod, said pivoted lever being connectible to the engine control, and a universal connection between the rod and pivoted lever.

13. A combination as described in claim 12 and an additional lever selectively engageable with the rod and connectible with the transmission controls.

14. In combination an engine, a transmission therefor, including an automatic ratio changing mechanism and fluid power means for effecting the ratio changes, controls for the engine and transmission, said controls comprising a starter switch for the engine, means for changing a fast idle condition in the engine to a slower idle, means for producing forward, neutral and reverse conditions in the transmission, a master switch for the automatic ratio changing mechanism and a master valve for the fluid power means; a manually operated lever, and means connecting the lever to the controls, said means comprising a fixed pivot for the lever, a rod movable with the lever, a support for the rod permitting rotation of said rod and lever, a pivoted lever located in proximity to the rod, said pivoted lever being connectible with the starter switch, with the means for changing from a fast idle to a slow idle and with the master valve for the transmission; a universal connection between the rod and pivoted lever, and an additional lever selectively engageable with the rod and connectible with the master switch for the speed responsive means and the means for producing forward, neutral and reverse conditions in the transmission.

15. In combination, an engine, a valve for controlling the idling speed of the engine and having a slow idling position and a fast idling position, a transmission adapted to be operated by the engine, means for conditioning the transmission for neutral, forward and reverse drives, a manually operated control for the conditioning means, said control having a forward drive condition, a reverse drive condition and a neutral condition and being movable in such neutral condition, and means connecting the valve with the manually operated control whereby the control may be utilized for selectively moving the valve to its fast idling position or its slow idling position while the control is in its neutral condition, said control being adapted to move said valve to its slow idling position just prior to the positioning of the control in forward or reverse drive condition.

16. Control mechanism for a power transmitting device comprising in combination, means for conditioning the power transmitting device for forward and reverse drives, power responsive means for completing a power train through said device, a source of power, means for operatively connecting said power source with said power responsive means, and a control lever for controlling said first named means and said third named means and movable in two planes, said planes intersecting and said lever having a neutral position at the intersection of the planes, movement of the lever in one of the planes serving to operate said first named means and movement in the other plane toward said neutral position serving to operate said third named means whereby said power responsive means may complete said power train.

17. Control mechanism for a power transmitting device comprising in combination, means for conditioning the power transmitting device for forward and reverse drives, a hydro-dynamic coupling for completing a drive through said device, a source of fluid under pressure, a valve for operatively connecting said fluid pressure source with said hydro-dynamic coupling, and a control lever for controlling said conditioning means and said valve and movable in two intersecting planes, movement of the lever in one of the planes serving to operate said conditioning means and movement in the other plane serving to operate said valve.

18. Control mechanism for a power transmitting device comprising in combination, means for conditioning the power transmitting device for forward and reverse drives, means for changing the torque multiplication through the device and including power responsive means, a source of power, means for operatively connecting said power source with said second named means, and a control lever for controlling said first and fourth named means and movable in two intersecting planes, the position of the lever common to both planes corresponding to neutral, movement of the lever in one of the planes serving to operate said first named means and movement in the other plane serving to operate said fourth named means, said lever when moved in said last named plane to the intersection of the planes serving to connect said power source and said second named means.

19. Control mechanism for a power transmitting device comprising in combination, means for conditioning the power transmitting device for forward and reverse drives, a hydro-dynamic coupling for completing a drive through said power transmitting device, means for changing the torque multiplication through said device and including fluid pressure responsive means, a source of fluid pressure, a valve for connecting said fluid pressure source with said hydro-dynamic coupling and said torque multiplication changing means, and a control lever for controlling said first named means and said valve and movable in two intersecting planes, movement of the lever in one of the planes toward the intersection of the planes serving to operate said valve to connect said fluid pressure source with said hydro-dynamic coupling and said torque multiplication changing means, and movement of the lever in the other plane serving to operate said first mentioned means for conditioning the transmission for operation in either forward or reverse.

20. In combination, an engine, a transmission and a coupling device between the engine and transmission, said device being adapted to transmit torque as a function of the speed of the engine, means for providing a certain fast idling speed and a normal idling speed in the engine, said transmission having means for establishing a neutral condition and a plurality of power transmitting conditions therein, a control for the transmission selectively to establish said conditions, said first named means being associated with said control whereby the control while providing said neutral condition in the transmission may provide said fast idling speed in the engine and being operable prior to the setting of the control for each of said conditions in the transmission other than neutral for providing the normal idling speed in the engine instead of the fast idling speed.

21. A combination as described in claim 20, said coupling device comprising a hydro-dynamic vaned coupling.

22. A combination as described in claim 20, said coupling device comprising a hydraulic torque converter.

23. In combination, an engine, a carburetor therefor, means for providing a certain fast idling condition in the carburetor for causing a certain fast idling speed in the engine and for providing a normal idling condition in the carburetor, a transmission driven from the engine and having means for establishing a plurality of power transmitting conditions and a neutral condition therein, a control for the transmission selectively to establish said conditions therein, said first named means being associated with said control whereby the control while providing said neutral condition in the transmission may provide said fast idling condition in said carburetor and being operable prior to the setting of the control for each of said power transmitting conditions in the transmission for providing the normal idling condition in the carburetor instead of the fast idling condition.

24. In combination, an engine, a valve for controlling the speed of the engine, said valve having a certain fast idling position for providing a certain fast idling speed in the engine and having also a normal idling position, a transmission adapted to be operated by the engine, means for conditioning the transmission for neutral and forward and reverse drives, a manually operated control for the conditioning means, and means connecting the valve with the manually operated control whereby the control while conditioning the transmission for neutral may provide said fast idling position of said valve and being operable prior to the setting of the control for forward or reverse drive for providing the low idling position of the valve instead of the fast idling position.

25. In combination, an engine, a valve for controlling the speed of the engine and having a certain fast idling position and also a slow idling position, the speed of the engine with the valve being in its slow idling position being substantially the lowest possible without stalling, the valve in its fast idling position being substantially less than fully open and causing a certain fast idling speed in the engine, a transmission driven from the engine and having means for establishing a plurality of power transmitting conditions and a neutral condition therein, a control for the transmission selectively to establish said conditions, and means connecting said valve with said control whereby the control while providing said neutral condition in the transmission may be moved to provide said fast idling position of the valve and being operable prior to the setting of the control for each of said power transmitting conditions for providing the low idling position of the valve instead of the fast idling position.

26. In combination, an engine; means for providing a certain fast idling speed and a normal idling speed in the engine; a transmission driven from the engine and having means for establishing a plurality of power transmitting conditions and a neutral condition therein; a control for the transmission selectively to establish said conditions in the transmission; said first named means being associated with said control whereby when the control provides a neutral condition in the transmission, said fast idling speed in the engine may be provided by moving the control to a limit of its movement; said first named means being operable prior to the setting of the control for each of said power transmitting conditions in the transmission for providing the normal idling speed in the engine instead of the fast idling speed.

WILLIAM B. OSBORNE.